UNITED STATES PATENT OFFICE.

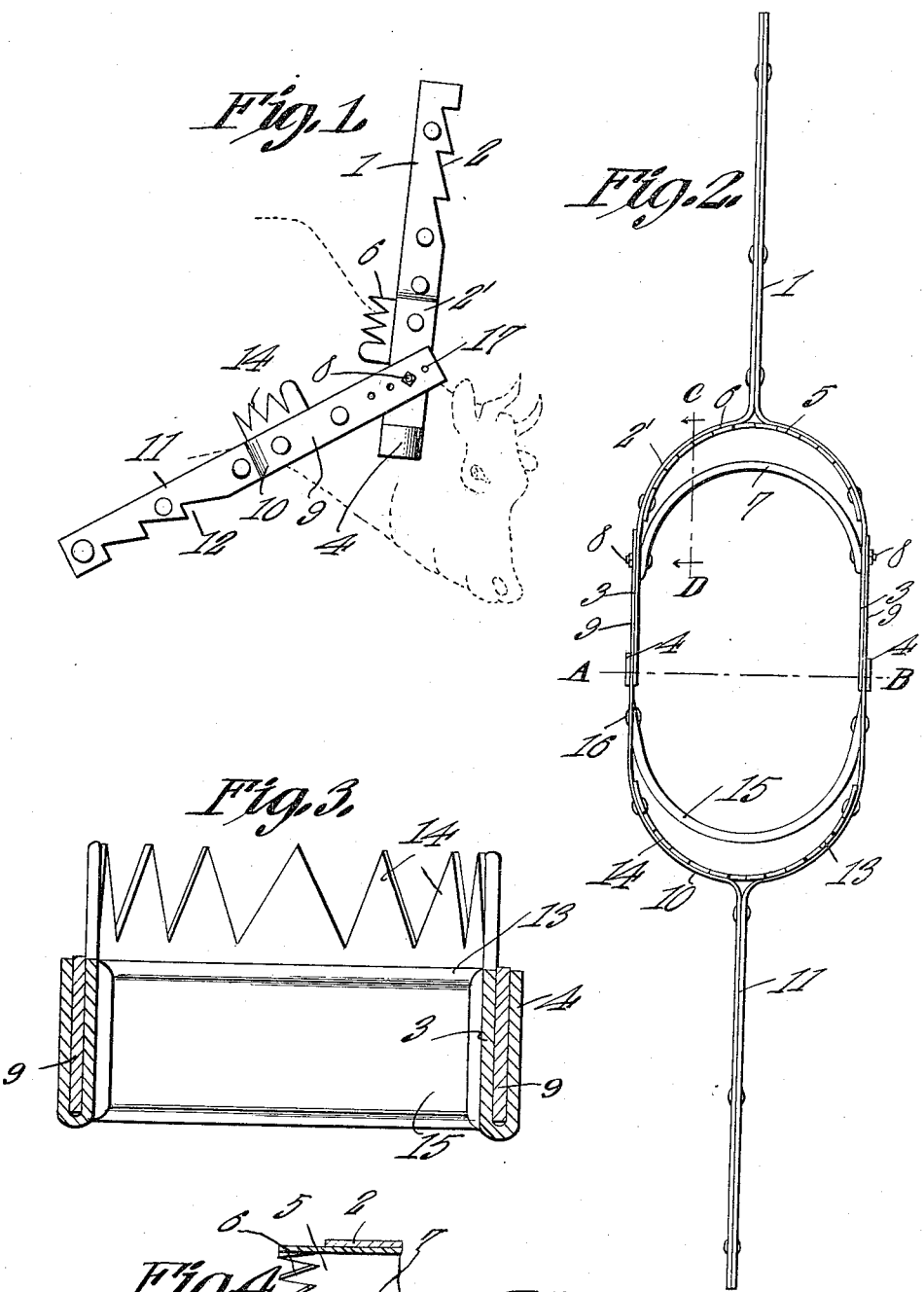

DASHLER M. REEDY, OF CHILDRESS, TEXAS.

COW-YOKE.

1,175,013.

Specification of Letters Patent. Patented Mar. 14, 1916.

Application filed March 18, 1915. Serial No. 15,382.

*To all whom it may concern:*

Be it known that I, DASHLER M. REEDY, a citizen of the United States, residing at Childress, in the county of Childress and State of Texas, have invented a new and useful Cow-Yoke, of which the following is a specification.

This invention relates to a cow yoke, its object being to provide a simple and durable device of this character which can be readily applied to an animal and which can be adjusted to animals of different sizes, the yoke being so constructed as to engage a fence when the animal makes an effort to pass through it, such engagement with the fence causing the yoke to bite into the animal so as to cause it to withdraw from the fence, the parts of the yoke being held by gravity normally in position where they will not injure the animal or prevent it from grazing.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the yoke, one of the positions assumed thereby during the grazing of the animal to which it is applied, being illustrated. Fig. 2 is an enlarged rear elevation of the yoke, the parts being shown in their normal or upstanding positions. Fig. 3 is an enlarged section on line A—B Fig. 2. Fig. 4 is an enlarged section on line C—D Fig. 2.

Referring to the figures by characters of reference 1 designates the upper arm of the yoke, the same being provided in its front face with notches 2. The lower end of the arm has oppositely curved extensions 2' merging into parallel terminals 3, each terminal being provided with a clip 4 forming a stop for the purpose hereinafter pointed out. Secured to the inner or concaved faces of the extensions 2' is a supplemental strip 5 having rearwardly extending teeth 6. An arched bearing strip 7 is arranged between and secured at its ends to the extensions 2' and is preferably curved transversely as shown particularly in Fig. 4, this bearing strip being located some distance below the supplemental strip 5. The bolts 8 used for fastening the bearing strip 7 to the extensions 2' constitute pivots for the upper ends of the straight sides 9 of oppositely curved extensions 10 provided at the upper end of an arm 11. This arm 11 is provided in its front with a series of notches 12 similar to the notches 2. A supplemental arcuate strip 13 is secured to the upper faces of the extensions 10 and has rearwardly extending teeth 14. An arcuate bearing strip 15 similar to the strip 7 hereinbefore described is arranged between the straight sides of the extensions 10 and is secured to them in any suitable manner as by means of rivets 16 or the like. The extensions 10 are normally seated in the clips 4 as shown in Figs. 2 and 3. Each bolt 8 is adapted to project into any one of a series of apertures 17 formed in the adjacent extension 10 so that it is thus possible to adjust the two bearing strips 7 and 15 toward each other to adapt the yoke for use in connection with animals of different sizes.

In using the device herein described, the extensions 10 are disengaged from the bolts 8, thus separating the upper and lower sections of the yoke, after which the upper section of the yoke is placed upon the neck of the animal, while the lower section is brought under the neck and the two sections adjusted toward each other. Bolts 8 are then reinserted into certain of the openings 17 and fastened so that the upper and lower sections are thus pivotally connected. As the lower section of the yoke is hung at its upper end, it normally hangs straight down by gravity and, as the weight of the lower section is applied to the upper section at points where the bearing strip 7 contacts with the top of the neck of the animal, it will be apparent that the weight of said lower section will act as a counterbalance to hold the arm 1 normally in a substantially upright position. With the parts thus positioned, the teeth 6 and 14 are supported out of contact with the animal and, as a matter of fact, the lower section of the yoke is capable of a considerable backward movement relative to the upper section before the points of the teeth are brought against the animal. Thus the animal can graze without being hindered by the yoke. If, however, the animal should attempt to force its head through a fence, the notches 2 and 12 would receive portions of the fence and force the arms 1 and 11 backwardly so that the teeth 6 and 14 would bite into the animal, thus causing it to withdraw its head. As soon as the arms 1 and 11 are relieved of pressure against an obstruction, they will automatically assume their upstanding or substantially vertical positions by gravity.

It will be apparent that the clips 4 limit the forward swinging movement of the arm 11 relative to the arm 1, but do not interfere with the backward swinging movement of said arm 11.

What is claimed is:—

A yoke including an upper arm having oppositely curved extensions, a bowed strip secured to the inner faces of the extensions and extending rearwardly therebeyond, the rearwardly extending portions being toothed, a bearing strip bowed from end to end and rounded transversely, said strip being spaced from the toothed strip and being secured at its ends to the end portions of the extensions, a lower arm having oppositely extending curved extensions, a toothed strip secured to the extensions and having a toothed portion extending rearwardly therebeyond, a bowed bearing strip rounded transversely and secured to the extensions of the lower arm, the extensions of the two arms being lapped and pivotally connected, and means upon the extensions of one of the arms for limiting the relative swinging movement of the two arms, the extensions of said arms being adjustably connected.

In testimony that I claim the foregoing as my own, I have hereto affixed my signature in the presence of two witnesses.

DASHLER M. REEDY.

Witnesses:
CHAS. W. KENSEY,
H. D. CORDELL.

Copies of this patent may be obtained for five cents each, by addressing the "Commissioner of Patents, Washington, D. C."